UNITED STATES PATENT OFFICE.

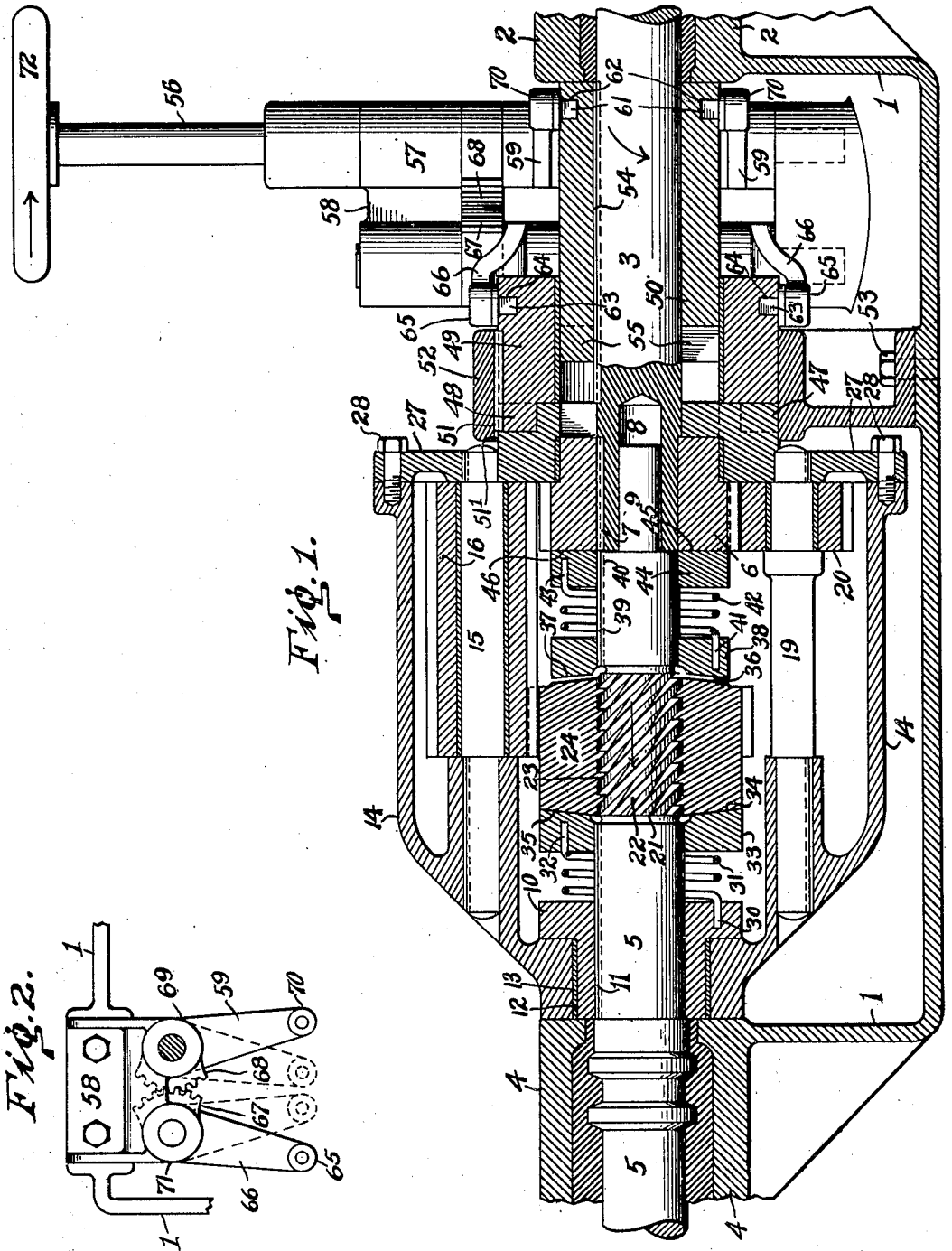

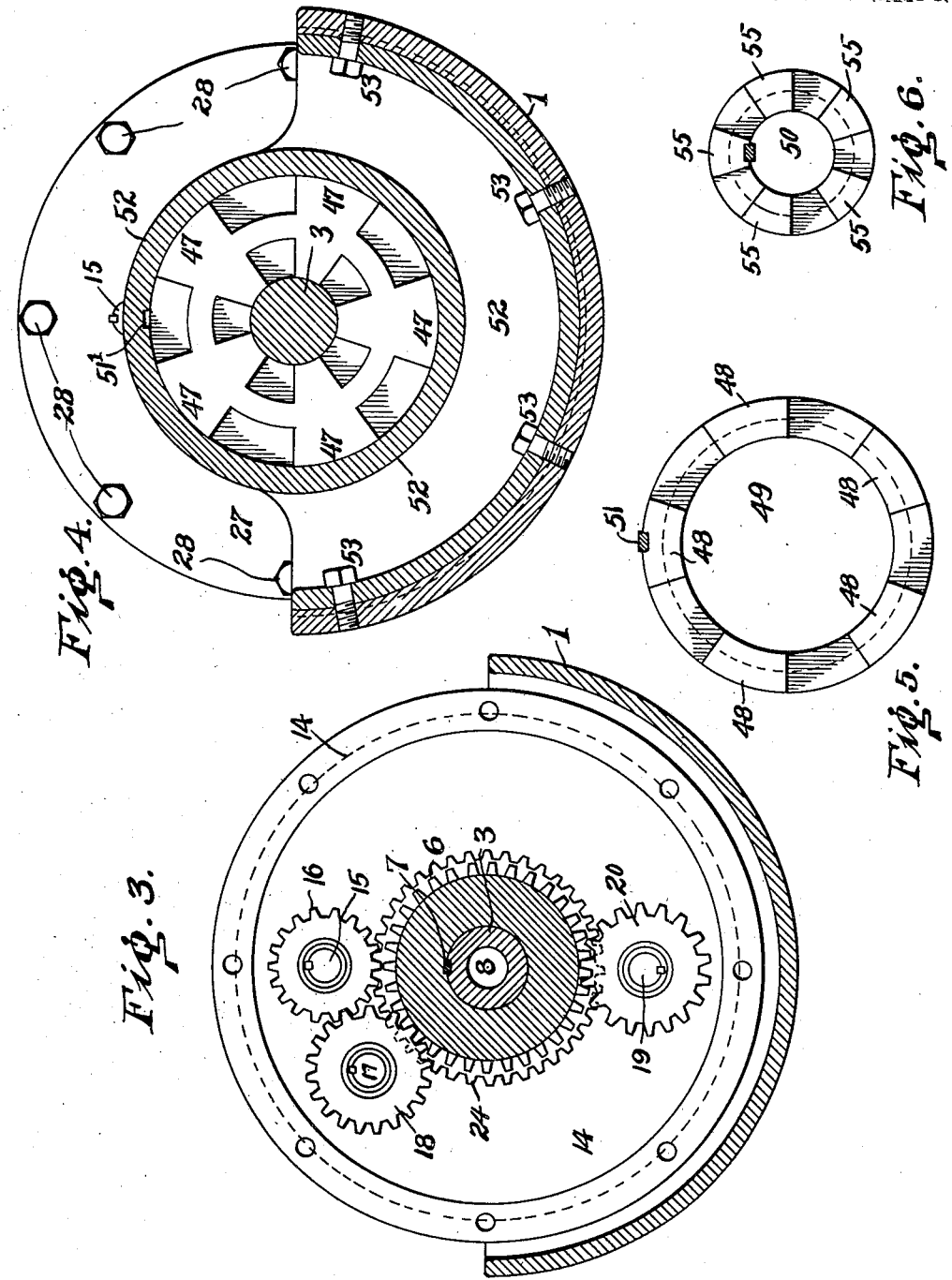

JOSEPH ESSER, OF CHESTER, PENNSYLVANIA.

REVERSING MECHANISM.

No. 919,562.  Specification of Letters Patent.  Patented April 27, 1909.

Application filed November 27, 1908. Serial No. 464,674.

*To all whom it may concern:*

Be it known that I, JOSEPH ESSER, a citizen of the United States, residing in Chester, in the county of Chester and State of Pennsylvania, have invented certain new and useful Improvements in a Reversing Mechanism, of which the following is a specification.

My invention relates to a mechanism for transmitting the motion of a driving shaft to a driven shaft, through the medium of gears, and the object thereof is to provide a simple, reliable and inexpensive arrangement by means of which a driven shaft could be either prevented from turning, or could be made to turn either in the same or in the opposite direction of a driving shaft, which may be revolving continuously in one direction only.

With these and other objects in view, my invention consists in the construction, combination and arrangement of parts as will be hereinafter described and claimed and illustrated in the accompanying drawings, it being understood that changes in form, size, shape and minor details may be within the scope of my claims without departing from the spirit or sacrificing any of the advantages of my invention.

In the accompanying drawings, Figure 1, is a longitudinal view of my invention; Fig. 2, is a plan view of a clutch operating means in connection therewith; Fig. 3, is a section showing a gearing arrangement; Fig. 4, is a view showing a clutching arrangement, and Figs. 5 and 6, are views of the clutches.

Similar figures refer to similar parts throughout the various views.

A frame 1, is provided with a bearing 2, for a driving shaft 3, and with a bearing 4, for a driven shaft 5, on shaft 3, is fixedly mounted on a driving gear 6, by a key 7. Shaft 3, is provided with a bearing 8, for a journal 9, of driven shaft 5. On shaft 5, is fixedly mounted a collar 10, by a key 11, which is provided with a journal 12, for a bearing 13, of a casing 14. The casing 14, carries a pin 15, on which is mounted a pinion 16, a pin 17, on which is mounted a pinion 18, and a pin 19, on which is mounted an idler 20.

The driven shaft 5, is provided with a worm 22, at 21, for a driven gear 24, mounted thereon, and is provided with an inner worm 23, to engage with worm 22, and is free to travel along worm 22. The driving gear 6, on shaft 3, meshes with pinion 18; pinion 18, meshes with pinion 16, and pinion 16, meshes with driven gear 24. To the collar 10, of shaft 5, is attached one end 30, of a spring coil 31, whose other end 32, is attached to a friction disk 33, slidingly mounted on key 11. The disk 33, is provided with a friction face 34, to be clutched by a friction face 35, of driven gear 24. The driven gear 24, is also provided with a friction face 36, to clutchingly engage a friction face 37, of a friction disk 38. Disk 38, is slidingly mounted on a key 39, fixed in shaft 5, at 40. To disk 38, is attached on end 41, of a spring coil 42, whose other end 43, is attached to a collar 44, fixedly mounted on key 39.

A clutching disk 27, provided with clutching jaws 47, is bolted on casing 14, by bolts 28. A sleeve 49, provided with clutching jaws 48, is slidingly supported from a band 52, bolted on frame 1, by bolts 53. The sleeve 49, surrounds a collar 50, which is slidingly mounted on shaft 3, over a key 54; and is provided with clutching jaws 55, to engage with clutching jaws 47, of disk 27.

On a shaft 56, supported by bearings 57, provided by a bracket 58, bolted to frame 1, are mounted gears 68, and the ends 69, of arms 59, whose ends 70, carry pins 61, which are free to turn in sockets 62, in collar 50. Pins 63, free to turn in sockets 64, of the sleeve 49, are revolvingly supported from ends 65, of arms 66, whose ends 71, carry gears 67, which are meshing with gears 68, fixedly mounted on shaft 56. On shaft 56, is mounted a hand wheel 72, by means of which the shaft may be turned to operate the arms for causing the clutches to either engage or to disengage for the purpose of either preventing the driven shaft from being driven by the driving shaft, or to cause the driven shaft to revolve either in the same direction with the driving shaft or in the opposite direction.

When the driven shaft 5, is stationary, the arms 66, are parallel with arms 59. If the hand wheel 72, is turned in the direction of the arrow, the arms 66, and 59, assume the position shown in Fig. 1, which corresponds to the full line position shown in Fig. 2. Sleeve 49, with its key 51, is caused to slide along the key-way 51', until its jaws 48, clutch the jaws 47, of disk 27, while the collar 50, is caused to slide on shaft 3, in the opposite direction. As sleeve 49, is prevented from turning by key 51, in key-way 51', of band 52, the casing 14, is locked on frame 1. If driving shaft 3, is revolving in the direction of the arrow, gear 6, revolves with it, and causes pinion 18, meshing therewith, to revolve in the opposite direction, which in its turn causes pinion 16, to revolve in the direction of gear 6. As pinion 16, meshes with the driven gear 24, it causes it to revolve opposite to the driving gear 6. Gear 24, having its worm 23, mesh with worm 22, of shaft 5, is thus caused to travel in the direction of the arrow, until its friction face 35, comes into frictional contact with face 34, of friction disk 33, when shaft 5, is caused to turn with it, until the coils of spring 31, are forced together, when shaft 5, is forced to revolve, at full speed, in the opposite direction to shaft 3.

If shaft 56, is turned in the opposite direction, until the arms 59, are parallel with arms 66, the jaws 48, are moved away from jaws 47, and clutching disk 49, becomes disengaged from clutching disk 27. Casing 14, is then free to revolve, and driven gear 24, runs idle, with its face 36, slipping past face 37, and shaft 5, remains stationary. If shaft 56, is now turned until arms 59, and arms 66, are in the position shown in dotted lines, the jaws 55, of collar 50, move inward and clutch jaws 47, of disk 27. Collar 50, being keyed on shaft 3, must revolve with it, and as it is also clutched with disk 27, casing 14, on which disk 27, is bolted, must revolve with the shaft 3. Driving shaft 3, casing 14, and the train of gears are thus forced to revolve together as one piece. Driven gear 24, is made to travel along worm 22, of driven shaft 5, until its friction face 36, comes in contact with friction face 37, of disk 38. Disk 38, is forced to slide on its key forcing the coils of spring 42, together, when driven shaft 5, is forced to revolve in the direction of driving shaft 3. Thus is the driven shaft 5, either held stationary, or is caused to revolve, either in the same direction of the driving shaft 3, or in the reversed direction, by means of the driven gear 24, mounted on the driven shaft, by its worm 23, meshing with the worm 22, on the driven shaft 5, which constitutes the chief feature of my invention.

What I, therefore, claim as new and desire to protect by Letters Patent, is—

1. In a reversing mechanism, the combination of a frame provided with a band, a driving shaft, and a driven shaft, a clutching collar slidingly mounted on the driving shaft, a clutching sleeve slidingly mounted around the collar and supported from the band, a casing revolubly mounted on the driven shaft, a clutching disk bolted thereto, means for operating the clutches, a gear fixedly mounted on the driving shaft, a driven pinion mounted in the casing and meshing with the gear on the driving shaft, a driving pinion mounted in the casing and meshing with the driven pinion, a driven gear meshing with the driving pinion and provided with an inner worm, a collar fixedly mounted on the driven shaft, a disk slidingly mounted on the driven shaft between the collar and the driven gear, a spring coil on the driven shaft connecting the collar with the disk, a collar fixedly mounted, a disk slidingly mounted and a spring coil connecting the collar and disk on the driven shaft between the driving and the driven gear, and a worm on the driven shaft meshing with the worm of the driven gear.

2. In a reversing mechanism, the combination of a driving shaft, a driven shaft, and a frame provided with a band, a clutching collar slidingly mounted on the driving shaft, a clutching sleeve supported from the band, a casing revolubly mounted on the driven shaft, a clutching disk attached to the casing, a driving gear fixedly mounted on the driving shaft, a driven pinion mounted in the casing and meshing with the driving gear, a driving pinion mounted in the casing and meshing with the driven pinion, a driven gear provided with friction faces meshing with the driving pinion and provided with an inner worm, a worm on the driven shaft meshing with the gear worm, a friction disk slidingly mounted on the driven shaft and facing one of the friction faces of the driven gear, a collar fixedly mounted on the driven shaft and a spring coil connecting the collar with the disk, a collar fixedly mounted on the driven shaft and facing the driving gear, a friction disk facing the other friction face of the driven gear and a spring coil connecting the disk with the collar and slidingly mounted on the driven shaft.

3. In a reversing mechanism, the combination of a driving shaft, a driven shaft and a frame provided with a band, a collar provided with clutching jaws to rotate with the driving shaft and slidingly mounted thereon, a sleeve provided with clutching jaws slidingly supported from the band, a casing revolubly mounted on the driven shaft, a disk provided with clutching jaws bolted on the casing, a means to operate the clutching devices, a driving gear fixedly mounted on the driving shaft, a train of pinions mounted in the casing, a driven gear provided with friction faces, a collar fixedly mounted on the driven shaft, a disk with a friction face facing a friction face of the driven gear and a spring coil connecting the disk with the collar, a collar facing the driving gear, a friction disk slidingly mounted on the driven shaft and facing a friction face of the driven gear and a spring coil connecting the collar with the disk, a worm on the driven shaft and a worm in the driven gear meshing therewith.

4. In a reversing mechanism, the combination of a unidirectional driving shaft, a bidirectional driven shaft and a frame, provided with bearings for said shafts, a collar fixedly mounted on the driven shaft, a pinion casing revolubly mounted thereon, a slidingly mounted friction disk and a spring coil connecting the disk with the collar, a driven gear provided with an inner worm, a friction disk facing the gear, a fixedly mounted gear on the driving shaft, a collar fixedly mounted on the driven shaft and facing said gear, a spring coil connecting said collar and disk, a collar slidingly mounted on the driving shaft, a band attached to the frame, a sleeve revolubly mounted on the collar and slidingly supported from the band, a disk attached to the revolubly mounted casing, and an operating means to cause the slidingly mounted collar and sleeve to slide in opposite directions.

5. In reversing mechanism, a unidirectional and continuously revolving driving shaft, a driving gear fixedly mounted thereon, a bidirectional and intermittently revoluble driven shaft and provided with a worm, a driven gear provided with an inner worm to engage the shaft worm and provided with two friction faces, a fixedly mounted collar facing the driving gear and a slidingly mounted disk facing the driven gear, a spring coil between them and mounted on the driven shaft, a collar fixedly mounted on the driven shaft, a disk with a friction face, a spring coil connecting the disk with the collar, a casing revolubly mounted on the collar, pinions mounted in the casing and meshing with the driving and driven gears, a disk provided with clutching jaws bolted on the casing, a frame provided with shaft bearings, a band attached to the frame, a sleeve provided with clutching jaws slidingly supported from the band, a means to cause the sleeve jaws to clutchingly engage the disk jaws, a collar provided with clutching jaws slidingly mounted on the driving shaft, a means to cause the collar jaws to clutchingly engage the disk jaws, and a mechanism to cause the collar and sleeve to slide in opposite directions.

6. In a reversing mechanism, the combination of a stationary frame provided with shaft bearings, a unidirectional and continuously revolving driving shaft, and a bidirectional intermittently revoluble driven shaft, a driving gear fixedly mounted on and revolving with the driving shaft, a worm on the driven shaft, a driven gear provided with two friction faces and with an inner worm to engage the shaft worm and free to travel along said shaft worm, a disk slidingly mounted a collar fixedly mounted and a spring coil on the driven shaft, a casing revolubly mounted on the collar, a disk slidingly mounted a collar fixedly mounted and a spring coil on the driven shaft and between the driving and the driven gear, a casing revolvingly mounted on a collar, a disk provided with clutching jaws attached to the casing, a band attached to the frame, a sleeve provided with clutching jaws slidingly supported from the band, a collar provided with clutching jaws slidingly mounted on the driving shaft and revolubly surrounded by the sleeve, and an operating means to prevent the disk, sleeve and collar from clutchingly engaging each other.

7. In a reversing mechanism, the combination of a stationary frame provided with shaft bearings, a unidirectional and continuously revolving driving shaft, a bidirectional and intermittently revoluble driven shaft, a driving gear fixedly mounted on the driving shaft, a worm on the driven shaft, a driven gear provided with friction faces and with an inner worm to travel along the shaft worm, a fixedly mounted collar on the driven shaft, a disk slidingly mounted between the collar and the driven gear, a casing revolvingly mounted on the collar, a disk provided with clutching jaws attached to the casing, a band attached to the frame, a sleeve provided with clutching jaws slidingly supported from the band, a collar provided with clutching jaws slidingly mounted on the driving shaft, and an operating means to cause the sleeve to clutchingly engage the disk jaws.

8. In a reversing mechanism, the combination of a stationary frame, a revolving driving shaft, and a revoluble driven shaft, a driving gear fixedly mounted on the driving shaft, a worm on the driven shaft, a driven gear with an inner worm to travel along the shaft worm, a collar fixedly mounted on the driven shaft, a disk slidingly mounted between the collar and the driven gear, a casing revolvingly mounted on the collar, a disk provided with clutching jaws attached to the casing, a band attached to the frame, a sleeve provided with clutching jaws slidingly supported from the band, and an operating means to cause the sleeve to clutchingly engage with the disk of the casing.

9. In a reversing mechanism, the combination of a frame, a driving and a driven shaft, a driving gear fixedly mounted on the driving shaft, a driven gear travelingly mounted on the driven shaft, a collar fixedly mounted on the driven shaft, a casing mounted on the collar, a disk and a spring coil between the collar and the driven gear, a disk, a collar and a spring coil between the driving and driven gears, a disk provided with clutching jaws attached to the casing, a band attached to the frame, a sleeve provided with clutching jaws slidingly supported from the band, a collar slidingly mounted on the driving shaft, and an operating means to prevent the clutching engagement between the disk and the collar when the disk and the sleeve are clutchingly engaged, and to prevent the engagement between the disk and the sleeve when the disk and the collar are clutchingly engaged.

In testimony whereof I have signed this specification in the presence of two subscribing witnesses.

JOSEPH ESSER.

Witnesses:
ERNST SCHMIDT,
EMIL EICHEL.